Feb. 1, 1944. H. H. SEIFERT 2,340,621
POWER SUPPLY SYSTEM
Filed July 2, 1940
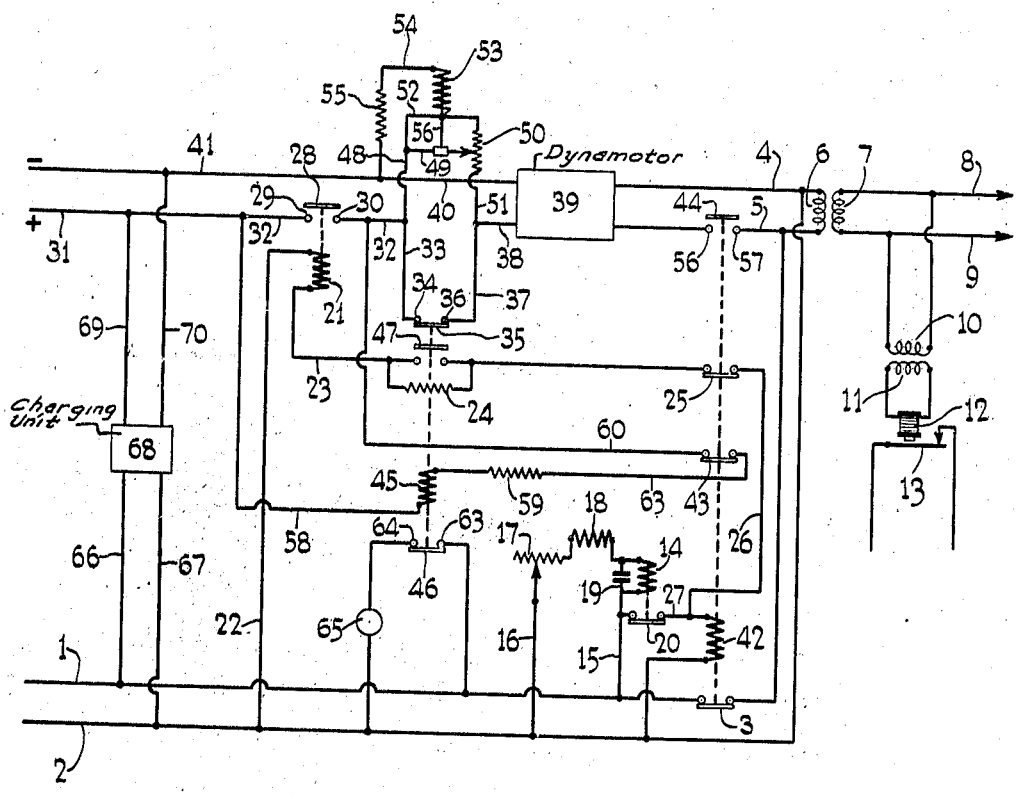
INVENTOR
Harry H. Seifert
BY
Lyman E. Dodge
ATTORNEY Patented Feb. 1, 1944

2,340,621

UNITED STATES PATENT OFFICE 2,340,621

POWER SUPPLY SYSTEM

Harry H. Seifert, Troy, N. Y.

Application July 2, 1940, Serial No. 343,525

4 Claims. (Cl. 171—97)

This invention relates to power distribution systems especially distribution systems including two different sources of different kinds of electrical energy and particularly such systems adapted for feeding energy to a railroad signal system.

It is well understood by those skilled in the art that in those types of railway signal systems in which the track circuit is fed from a battery and the signals and line circuits are also fed from a battery failure of the energy source occurs only at individual locations and not as a whole so that although train interruption may occur at one or two places and then only for the length of a block or two, the whole system is not paralyzed.

It is also well known that with many of the more modern types of signal systems the energy for the operation of track relays, line relays, and signals is derived from a line paralleling the trackway. If a failure to supply energy to this line occurs, then the entire signal system for the entire length of the railway served by such line is rendered inoperative with the consequent disastrous delay to train movements.

A principal object of this invention is to supply a power distribution system of the type specified in which the line serving the load will be normally supplied with electrical energy from one source, which may well be a source supplying the entire line of railway, and which includes a secondary source of electrical energy of the battery type with an arrangement such that upon a failure of the first source, the second source will be caused to start and operate an electrical generator which will then generate electrical energy of substantially the same nature as the energy supplied from the first source and will start to operate and succeed in supplying its electrical energy before an electrical device of the load circuit, especially a relay has had time to release its armature.

Other objects and advantages will appear as the description of the particular physical embodiment selected to illustrate the invention progresses, and the novel features will be particularly pointed out in the appended claims.

In describing the invention in detail and the particular physical embodiment selected to illustrate the invention, reference will be had to the accompanying drawing consisting of a single figure which is a schematic or diagrammatic illustration of parts and circuits embodying applicant's invention.

In the drawing, conductors 1 and 2 are intended to be connected to a source of alternating current electricity or energy, here stated to have a difference of potential of 115 volts. These conductors 1 and 2 connect through a relay armature 3 to the conductors 4 and 5 across which is the primary 6 of a transformer, the secondary 7 of which is connected to a line including conductors 8 and 9 across which the load is to be connected.

In the present case applicant has illustrated the load, a relay as being connected through a transformer, the primary of which is designated 10 and the secondary of which is designated 11 with the secondary 11 connected to the relay 12 having an armature 13.

The relay 12 may be considered as typical of a track relay, a line relay or a signal motor retaining device. This relay may be of various types but whatever its type, if it is used in a signalling system of the ordinary type, it is most likely to have a very quick release and for the purposes of this case applicant is to assume that the relay 12 has a time of release of about 0.2 second.

14 designates a resonant relay connected across the lines 1 and 2 by conductors 15 and 16. This resonant relay has adjustable resistance 17 in series therewith together with a reactance 18 and in shunt thereto is a condenser 19. Resonant relay 14 has an armature 20 which will release upon a 10 to 12% drop in voltage across the supply wires 1 and 2.

When a failure of energy supply to supply lines 1 and 2 is about to occur and the first drop of 10 to 12% occurs and relay 14 releases its armature 20, then relay 21 is de-energized because the circuit thereof is from supply line 2 through conductor 22 through the coil of the relay and then through conductor 23, resistance 24, armature 25, conductor 26, conductor 27, armature 20, and conductor 15 to the other supply conductor. This relay 21, being controlled by armature 20, is de-energized upon the releasing of armature 20 and so armature 28 of relay 21 makes contact between the points 29 and 30 and it does this in a time equal to about one half cycle of the frequency of the alternating current supply which is here assumed to be a supply having a frequency of sixty cycles per second. If the supply should abruptly fail, however, relay 21 would be de-energized in the time of about one half cycle.

When armature 28 connects points 29 and 30, direct current may then flow from the positive terminal 31 of a 150 volt direct current battery, through conductor 32, point 29, armature 28, conductors 30, 32 and 33, point 34, armature 35, point 36, conductors 37 and 38 to the motor side of an inverter or a dynamotor 39 and thence by conductors 40 and 41 to the negative terminal of the direct current source. Current flowing through the motor side of the dynamotor 39 causes that motor to start operating. Although the dynamotor is constructed to generate a predetermined voltage, when the motor side is energized from a direct current source of only about 115 volts, when 150 volts, or something in excess of 115 volts, is applied to the motor side of the dynamotor it would be over-excited and although it would not instantly attain full speed, it will, nevertheless very soon and before attaining full speed, generate substantially the proper output voltage. The full voltage of the direct current source is not continuously supplied to the motor side of the dynamotor because, within a time less than the time required for relay 12 to drop its armature 13, relay 42 will drop its armatures 3, 43, 25 and 44. In fact, relay 42 is designed to release its armatures in about two and one half cycles of the frequency of the source connected to supply conductors 1 and 2. As soon as armature 43 is released, the circuit through relay 45 is broken and consequently armatures 46, 47 and 35 are dropped to their released position. This breaks the circuit between the points 34 and 36, and consequently, the current from the positive terminal of the direct current source instead of going from conductor 32 to conductor 33 must now go through conductors 48 and 49, resistance 50, and conductor 51 to conductor 38 and thence through the motor side of the dynamotor back to the negative terminal of the battery. As current flows through the resistance 50 the voltage applied to the terminals of the motor side of the dynamotor is thereby altered and it is altered so that it will be a proper value regardless of the value of the voltage of the direct current source. This result is obtained by causing the current to also flow from conductor 48 through conductor 52 to coil 53, conductor 54 and resistance 55 to the conductor connected to the negative terminal of the source. The coil 53 by means of plunger 56 adjusts 49 along resistance 50 in accordance with the voltage of the source, in short, the motor side of the dynamotor is controlled by an automatic voltage regulator.

Upon the release of the armatures of relay 42 not only is the automatic voltage regulator thrown into action when the dynamotor has attained full voltage, that is, in about six cycles, as relay 45 is a slow release relay, but armature 44 connects the points 56 and 57 and so connects the generator side of the dynamotor to the primary 6 of the transformer so that the dynamotor then carries the load because armature 3 at that time is then in the released position disconnecting the alternating current source from the primary 6 of the transformer.

As the dynamotor is not constantly operated, it is wise and perhaps necessary to detect the integrity of the circuit. This integrity is detected by the use of relay 45. This relay has one side connected by the conductor 58 to battery side of the contact 29 and the other side of the relay 45 is connected through a resistance 59, relay armature 43 and conductor 60 to the dynamotor side of the point 30 so that, normally, current flows in a circuit from the positive terminal of the direct current source, through conductors 31 and 58, relay 45, resistance 59, conductor 61, armature 43, conductors 60, 32 and 33, point 34, armature 35, point 36, conductors 37 and 38, motor side of dynamotor 39, and thence to the negative terminal of the source. The current flowing in the above traced path maintains the armature of relay 35 in the upper or attracted position and so closes the circuit across from contact 63 to contact 64 and so enables the indicating device 65 to be energized from across the supply lines 1 and 2. Just so long as this indicating device 65 shows the energized condition of relay 45, it is certain that the circuit for the motor side of the dynamotor is intact. Of course, when relay armature 28 connects points 29 and 30, relay 45 is de-energized, because shunted, and the indicator 65 so indicates.

When the supply is again intact and electrical energy is being supplied to the supply line 1 and 2 the resonant relay 14 is energized, its armature 20 is attracted and relay 42 is energized by being connected across the supply lines 1 and 2. The armatures of relay 42 being moved to the upper or attracted position, armature 3 connects the supply line to the primary 6 of the transformer and so enables the load to be carried from the supply line. Relay 21 is energized and breaks contact between points 29 and 30 and relay 45 is energized and energizes indicator 65 so that the system returns to normal.

Applicant has not illustrated and described various safety and cut out devices which may be used with the system as those are a question of choice as automatic circuit breakers and thermal fuses may be inserted as required. Applicant has, however, illustrated that the direct current battery source may be charged from the supply lines by illustrating in a conventional way conductors 66 and 67 connecting a charging unit 68 which is in turn connected by conductors 69 and 70 to the terminals of the direct current source so that the direct current source, such as a storage battery may receive a constant charge from supply lines when energy is being supplied thereto.

By the proper distribution system hereinbefore described, there is provided a means whereby failure of signals may be obviated where those signals are supplied from an alternating current source, such as a commercial source, upon failure of that source and this may be done automatically without the intervention of manual operations and is done by a system which does not require a constantly running generator, and further, the interchange is done so quickly that even the fastest releasing relay in the signal system will not have an opportunity to release its armature.

Although I have particularly described one particular physical embodiment of my invention and explained the operation, construction and principle thereof, nevertheless, I desire to have it understood that the form selected is merely illustrative, but does not exhaust the possible physical embodiments of the idea of means underlying my invention.

What I claim as new and desire to secure by Letters Patent of the United States, is:

1. A power supply system, including in combination: a first source delivering alternating electricity at a predetermined voltage; a second source of direct current electricity; an electrically operable device normally in one condition and biased to another condition which it will assume upon failure of energy for a predetermined period; means connecting the first source and the electrically operable device; a dynamotor; means for connecting said dynamotor to said second source for receiving excess voltage therefrom, generating alternating current of at least said predetermined voltage, applying said voltage to said electrically operable device, and disconnecting said first source of power from said electrically operable device upon the failure of said first source all within the said predetermined period and then supplying normal voltage to said dynamotor from said second source.

2. A power supply system, including in combination: a relay including an armature; conductors electrically connected to said relay; a first source of power delivering alternating electricity at a predetermined voltage; a second source of direct current power; means connecting the first source of power to said conductors; a normally idle dynamotor and means for connecting said dynamotor to said second source to receive excess voltage and activating said dynamotor and applying electrical power to said conductors from said dynamotor at substantially the said predetermined voltage and disconnecting said first source of power from said conductors before said relay releases its armature upon the failure of said first source and then supplying normal voltage to said dynamotor from said second source.

3. A power supply system, including in combination: a first source of power delivering alternating electricity at a predetermined voltage; a second source of power; a load; means connecting the load with the first source of power; a normally unenergized dynamotor and means for energizing said dynamotor with excess voltage from said second source to deliver alternating electricity, at least at substantially said predetermined voltage, connecting said dynamotor to said load, and disconnecting said load from the first source within the period of two and one half cycles of said first source upon the failure of said first source and then supplying normal voltage to said dynamotor from said second source.

4. A power supply system, including, in combination: a first source delivering alternating electricity at a predetermined voltage; a resonant relay including an armature connected across said source, said relay operable to release its armature upon a 10% to 12% voltage drop; a second relay including a plurality of armatures, said relay connected across said source and including in series therewith said resonant relay armature, said relay further releasing its armature when de-energized within a predetermined time; a third relay including an armature, said third relay connected across said source and, including in series therewith, an armature of said second relay and the armature of said resonant relay, and a gap therein shunted by a limiting resistance, said third relay releasing its armature in substantially one half a cycle of said alternating electricity; a four relay, including a plurality of armatures, said fourth relay connected in shunt of the armature of said third relay and including in series therewith a limiting resistance and an armature of said second relay; an indicating device connected across said source and including an armature of said fourth relay whereby an indication is produced that said fourth relay is or is not energized; a source of direct current; a dynamotor, the motor side thereof being connected across said direct current source and in series with said fourth relay whereby the integrity of the circuit is indicated by said indicating device, said circuit further including an armature of said second relay and an armature of said fourth relay; said third relay also including an armature of said fourth relay in shunt to the limiting resistance in the third relay circuit when said fourth relay is de-energized; a resistance adjustable in accordance with the voltage of said direct current source; said dynamotor also included in a circuit with said source of direct current and including an armature of said third relay when said third relay is de-energized and including said adjustable resistance; a normally energized relay including an armature; means including a circuit including an armature of said second relay when energized connecting said normally energized relay with said first source of electricity, and means including a circuit including an armature of said second mentioned relay when de-energized and the generating side of said dynamotor for supplying alternating electricity to said normally energized relay whereby the normally energized relay is supplied by said first source normally and by said dynamotor when said first source fails and before said armature of said normally energized relay is released, which interval is not greater than said predetermined period.

HARRY H. SEIFERT.